United States Patent
Zhang (10) Patent No.: US 7,969,903 B2
(45) Date of Patent: Jun. 28, 2011

(54) METHOD, APPARATUS AND SYSTEM FOR HYBRID-MULTIPLEXING AND DEMULTIPLEXING

(75) Inventor: Yihua Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 12/504,754

(22) Filed: Jul. 17, 2009

(65) Prior Publication Data
US 2010/0142550 A1   Jun. 10, 2010

(30) Foreign Application Priority Data
Dec. 10, 2008   (CN) .......................... 2008 1 0185800

(51) Int. Cl.
*H04L 1/00*   (2006.01)
(52) U.S. Cl. ........................................ 370/252; 370/468
(58) Field of Classification Search .................. 370/252, 370/345, 468, 470
See application file for complete search history.

(56) References Cited

U.S. PATENT DOCUMENTS

| | | | | |
|---|---|---|---|---|
| 4,928,273 | A | * | 5/1990 | Protopapas .................... 370/458 |
| 5,062,105 | A | * | 10/1991 | McKnight et al. ............ 370/538 |
| 2006/0077937 | A1 | | 4/2006 | Guarino |
| 2006/0268976 | A1 | * | 11/2006 | Baum et al. .................... 375/239 |
| 2008/0259901 | A1 | * | 10/2008 | Friedman et al. ............ 370/349 |
| 2009/0125363 | A1 | * | 5/2009 | Frederiksen et al. ............ 705/8 |
| 2009/0219875 | A1 | * | 9/2009 | Kwak et al. .................... 370/329 |
| 2010/0209107 | A1 | * | 8/2010 | Yin ................................. 398/66 |
| 2010/0323733 | A1 | * | 12/2010 | Klein et al. .................... 455/501 |

FOREIGN PATENT DOCUMENTS

| | | |
|---|---|---|
| EP | 1 983 668 A2 | 10/2008 |
| WO | WO 01/10046 A2 | 2/2001 |

OTHER PUBLICATIONS

Extended European Search Report in counterpart European Application No. 09165625.6-2415, mailed Jul. 21, 2010.
Sampei, Seiichi, et al., "Adaptive Modulation/TDMA Scheme for Personal Multi-Media Communication Systems," *IEEE*, pp. 989-993, Nov. 28, 1994.

* cited by examiner

*Primary Examiner* — Melvin Marcelo
(74) *Attorney, Agent, or Firm* — Leydig, Voit & Mayer, Ltd.

(57) ABSTRACT

This invention discloses method, apparatus and system for hybrid-multiplexing and demultiplexing. The technical solution of the present invention obtains a corresponding preset frame structure parameter set in accordance with specific circumstances of the current link bandwidth, and hybrid-multiplexes byte streams of received services in accordance with the frame structure parameter set to form a multiplexed frame adapted to the current link bandwidth, so as to achieve the objective of making full use of the link bandwidth. Moreover, when the bandwidth of the physical link varies due to switching of modulation modes on the physical link, the hybrid-multiplexing apparatus adaptively changes the frame structure of the multiplexed frame without breaking off the service. In other words, the hybrid-multiplexing method supports ACM switching.

7 Claims, 4 Drawing Sheets

METHOD, APPARATUS AND SYSTEM FOR HYBRID-MULTIPLEXING AND DEMULTIPLEXING

CROSS-REFERENCE TO RELATED APPLICATIONS

This application claims priority to Chinese Patent Application No. 200810185800.X, filed Dec. 10, 2008, which is hereby incorporated by reference in its entirety.

FIELD OF TECHNOLOGY

The present invention relates to the technical field of communications, and more particularly to a method, an apparatus, and a system for hybrid-multiplexing and demultiplexing.

BACKGROUND OF THE INVENTION

Microwave transmission is greatly affected by weather. When the weather is fine, the transmission channel has high signal-to-noise ratio, and a higher modulation mode can be applied to the channel. To the contrary, during rainy and snowy days the signal-to-noise ratio of the transmission channel is decreased, and only a lower modulation mode can be applied to the channel with the same channel spacing. The function of such adaptive switching of modulation modes with variations in weather is referred to as adaptive code and modulation (ACM) switching.

Dynamic application of different modulation modes on the channel with the same channel spacing means that the bandwidth of the physical link varies with the circumstances of the weather, and, in order to enhance the utilization rate of the physical link, it is necessary for the frame structure of the multiplexed frame to also vary with variations of the link bandwidth. In the conventional art, the hybrid-multiplexing apparatus hybrid-multiplexes the data of various services to form multiplexed frames, and then sends them to the physical link for transmission. The frame structure of such a multiplexed frame is preset in accordance with such factors as the hybrid-multiplexing method and the attributes of the physical link, is invariant, and will not adaptively vary with variations of the bandwidth of the physical link. In other words, the conventional art hybrid-multiplexing method does not support ACM switching, and it is only possible to switch the frame structure of the multiplexed frame by using a method statically configured.

As the inventor of the present invention found during the process of research and practice about the conventional art, when the bandwidth of the physical link varies due to switching of modulation modes, use of the method of static configuration to switch the frame structure of the multiplexed frame would lead to service break during switching.

SUMMARY OF THE INVENTION

Embodiments of the present invention provide a method, an apparatus, and a system for hybrid-multiplexing and demultiplexing, with the objective of ensuring that the service does not break off while enhancing utilization rate of the link.

A method for hybrid-multiplexing comprises obtaining current link bandwidth mode information; obtaining from a storage a preset frame structure parameter set that corresponds to the current link bandwidth mode information; receiving byte streams of at least one service; and hybrid-multiplexing the byte streams of the services in accordance with the frame structure parameter set.

A method for demultiplexing comprises obtaining current link bandwidth mode information; obtaining from a storage a preset frame structure parameter set that corresponds to the current link bandwidth mode information; receiving a multiplexed frame hybrid-multiplexed from byte streams of at least one service; and demultiplexing the multiplexed frame into byte streams of various services in accordance with the frame structure parameter set.

A hybrid-multiplexing apparatus comprises an information obtaining unit, for obtaining current link bandwidth mode information; a parameter obtaining unit, for obtaining from a storage a preset frame structure parameter set that corresponds to the current link bandwidth mode information obtained by the information obtaining unit; a receiving unit, for receiving byte streams of at least one service; and a processing unit, for hybrid-multiplexing the byte streams of the services received by the receiving unit in accordance with the frame structure parameter set obtained by the parameter obtaining unit.

A demultiplexing apparatus comprises an information obtaining unit, for obtaining current link bandwidth mode information; a parameter obtaining unit, for obtaining from a storage a preset frame structure parameter set that corresponds to the current link bandwidth mode information obtained by the information obtaining unit; a receiving unit, for receiving a multiplexed frame hybrid-multiplexed from byte streams of at least one service; and a processing unit, for demultiplexing the multiplexed frame received by the receiving unit into byte streams of various services in accordance with the frame structure parameter set obtained by the parameter obtaining unit.

A communications system comprises a hybrid-multiplexing apparatus and a demultiplexing apparatus, of which the hybrid-multiplexing apparatus obtains current link bandwidth mode information, obtains from a storage a preset frame structure parameter set that corresponds to the current link bandwidth mode information, hybrid-multiplexes received byte streams of at least one service in accordance with the frame structure parameter set to form a multiplexed frame, and transmits the multiplexed frame to the demultiplexing apparatus; and the demultiplexing apparatus receives the multiplexed frame hybrid-transmitted from the hybrid-multiplexing apparatus, and demultiplexes the multiplexed frame into byte streams of various services.

The hybrid-multiplexing apparatus according to the embodiments of the present invention obtains the corresponding preset frame structure parameter set in accordance with the specific circumstances of the current link bandwidth, and hybrid-multiplexes received byte streams of a plurality of services in accordance with the frame structure parameter set to form multiplexed frames adapted to the current link bandwidth, so as to achieve the objective of making full use of the link bandwidth, and to make it possible, when switching of modulation modes on the physical link causes variation of the bandwidth of the physical link, that the hybrid-multiplexing apparatus adaptively varies (or switches) the frame structure of the multiplexed frame without the service being broken off, that is to say, the claimed hybrid-multiplexing method supports ACM switching.

BRIEF DESCRIPTION OF THE DRAWINGS

To explain the embodiments of the present invention or the technical solutions of the conventional art in a clearer manner, drawings necessary to illustrate the embodiments or the conventional art are briefly explained below. Obviously, the drawings explained below are merely directed to certain embodiments of the present invention, while it is possible for a person ordinarily skilled in the art to deduce additional drawings from these drawings without creative effort being spent in the process.

DETAILED DESCRIPTION OF THE EMBODIMENTS

The technical solutions in the embodiments of the present invention are clearly and completely described below with reference to the drawings. Obviously, the embodiments as described are only partial, rather than entire, embodiments of the present invention. All other embodiments deducible by a person ordinarily skilled in the art on the basis of the embodiments of the present invention and without spending creative effort fall within the protection scope of the present invention.

Embodiments of the present invention provide a hybrid-multiplexing method and a demultiplexing method. Embodiments of the present invention further provide the corresponding apparatus and system. These are respectively described below in greater detail.

First Embodiment

This embodiment starts from the perspective of the hybrid-multiplexing apparatus to describe the hybrid-multiplexing method provided by the present invention.

A hybrid-multiplexing method, whereby the hybrid-multiplexing apparatus firstly obtains the current link bandwidth mode information, then obtains from a storage a preset frame structure parameter set that corresponds to the current link bandwidth mode information, and hybrid-multiplexes received byte streams of a plurality of services into multiplexed frames in accordance with the frame structure parameter set.

Figure 1:
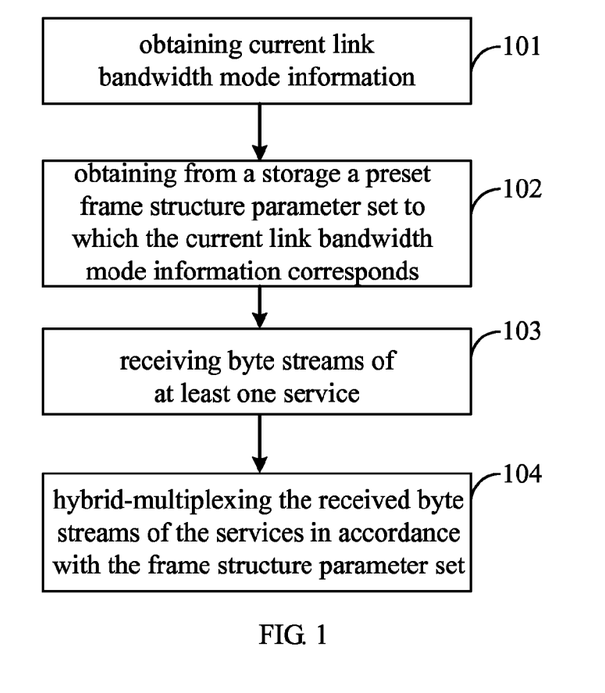
FIG. 1 is a flowchart showing the hybrid-multiplexing method provided by the first embodiment of the present invention.

As shown in FIG. 1, the operational flow of the hybrid-multiplexing method is described below.

In step 101, the hybrid-multiplexing apparatus obtains the current link bandwidth mode information, which can either be the link bandwidth value or the link bandwidth mode number. The following embodiments make explanations by all taking as an example the link bandwidth mode information being the link bandwidth mode number.

Link bandwidth modes are provided for all different modulation modes, and each link bandwidth mode has a link bandwidth mode number that identifies itself, that is to say, once obtaining the current link bandwidth mode number, the hybrid-multiplexing apparatus knows which modulation mode and which link bandwidth mode are currently employed by the physical link. The hybrid-multiplexing apparatus may obtain the current link bandwidth mode number prior to hybrid-multiplexing each frame of data. Of course, this will generate too many signaling flows. Accordingly, it is preferable for the hybrid-multiplexing apparatus to obtain the current link bandwidth mode number only when the modulation mode of the channel is varied. For instance, it is possible for the modulation device to notify the hybrid-multiplexing apparatus in advance when it is needed for the modulation mode to vary, indicating that the channel is about to switch to a new modulation mode, and that the link bandwidth of the physical link is about to vary, and to provide the link bandwidth mode number to which the new modulation mode corresponds.

In step 102, the hybrid-multiplexing apparatus obtains from a storage a preset frame structure parameter set to which the current link bandwidth mode information corresponds, for instance, by obtaining from the storage a preset frame structure parameter set to which the current link bandwidth mode number corresponds.

The frame structure parameter set is preset in accordance with such factors as the attributes of the physical link having ACM switching function and the attributes of the services transmitted over the physical link. The number of frame structure parameter sets corresponds or equals to the number of the link bandwidth modes. For instance, the physical link having ACM switching function has three link bandwidth modes, then respective one frame structure parameter set is calculated in accordance with each link bandwidth mode and the hybrid circumstance of the service under this link bandwidth mode. In other words, the physical link having ACM switching function has three frame structure parameter sets. Each link bandwidth mode number corresponds to one frame structure parameter set, and all frame structure parameter sets are subsequently stored in the storage, e.g., a storage of a programmable logic device.

In step 103, the hybrid-multiplexing apparatus receives the byte streams of at least one service, e.g., a plurality of services.

Before multiplexing, the services are respectively packaged and adapted as independent byte streams, for instance, the packet service can employ the Generic Framing Procedure (GFP) packaging method, and the time division multiplexing (TDM) service can employ the adapting method of asynchronous mapping, wherein link maintenance overhead can also be regarded as a service. Since packaging and adapting are not the essentials to the embodiments of the present invention, they are not to be redundantly described here. It is assumed in all embodiments of the present invention that other devices in the network have already packaged and adapted the various service streams as independent byte streams.

In step 104, the hybrid-multiplexing apparatus hybrid-multiplexes the byte streams of the received services in accordance with the frame structure parameter set, i.e., hybrid-multiplexes the byte streams of the received services into multiplexed frames in accordance with the frame structure parameter set.

For example, time slots, or bandwidths, can be assigned to various services in accordance with the frame structure parameter set, and the byte streams of a plurality of services are inserted into the respectively assigned time slots for transmission, so as to achieve the objective of hybrid multiplexing. Of course, other hybrid-multiplexing methods can also be employed.

As can be known from the above, the hybrid-multiplexing method as provided in this embodiment can support ACM switching. The hybrid-multiplexing apparatus according to this embodiment can obtain the corresponding preset frame structure parameter set in accordance with the specific circumstance of the current link bandwidth, and hybrid-multiplex the byte streams of a plurality of received services in accordance with the frame structure parameter set to form multiplexed frames adapted to the current link bandwidth, so as to achieve the objective of making full use of the link bandwidth. Moreover, when the bandwidth of the physical link varies due to switching of modulation modes on the physical link, the hybrid-multiplexing apparatus can adaptively vary the frame structure of the multiplexed frames without having to break off the service during such variation.

Second Embodiment

According to the method described in the first embodiment, the hybrid-multiplexing of the byte streams of a plurality of services in accordance with the frame structure parameter set can employ the following method (this embodiment makes explanation by taking as an example the link bandwidth mode information being the link bandwidth mode number).

Time slots, or bandwidths, are assigned to various services in accordance with the frame structure parameter set, and the byte streams of a plurality of services are respectively inserted into the respective assigned time slots for transmission.

There are many methods for assigning time slots, for instance, by assigning valid time slots in the multiplexed frames to various services in accordance with the ratio of the numbers of the time slots required by the various services. The time slots assigned to each service can either be continuous or interspersed among the various services. Of course, in order to make full use of the link bandwidth, reduce overhead in the frame structure, and lower the jittering and delay of the services during transmission, it is preferable for the time slots assigned to the various services to be approximately uniformly distributed in the frame period of one multiplexed frame. This will be explained in further detail below.

Firstly, to ensure that no damage is done to the service during link bandwidth switching, i.e., to avoid the circumstances of bit errors or erroneous packets, the clock frequency of the multiplexed frame can remain invariant under various frame structures, and the rate of the byte streams is then controlled via Clock Enable, that is to say, when the link bandwidth reduces, the number of Clock Enables in the same time also reduces, and vice versa. Each Clock Enable transmits data of one byte. Here, the position of the data of one byte, or in other words, the passage of the data of one byte, is referred to as one time slot, referring to FIG. 2, which shows the relationship among the Clock, Clock Enable and link bandwidth. In this embodiment the circumstance of the Clock Enable is described using parameters N and M.

Figure 2:
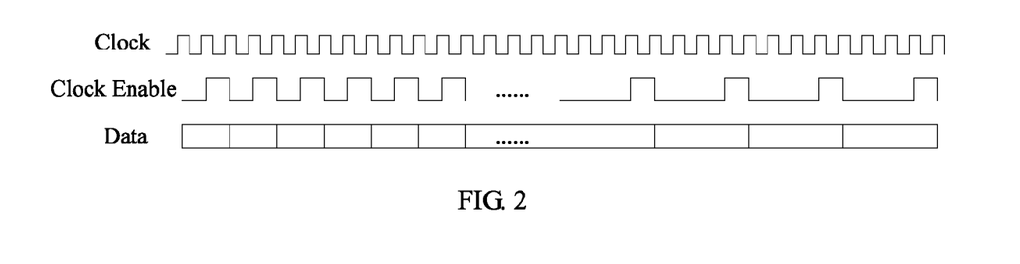
FIG. 2 is a schematic view illustrating the relationship among the Clock, Clock Enable and link bandwidth according to the second embodiment of the present invention.

Assume the number of Clock periods of each multiplexed frame is N, then the frame period T=N* Clock period. Further assume the total number of the time slots, or in other words the number of valid time slots, of each multiplexed frame is M, since each time slot is sized as 8 bits, it is deducible that the link bandwidth is M*8/T bits. To make full use of the link bandwidth, it is possible to employ an approximately uniform distribution algorithm to approximately uniformly distribute the M valid time slots in the frame period T of one multiplexed frame, namely in N Clock periods. The M valid time slots in each multiplexed frame are then sequentially assigned to the various services by using the approximately uniform distribution method. For example, when service 1 requires L1 time slots, L1 time slots (or positions) are selected from M time slots (or positions) to be assigned to service 1, and positions of the L1 time slots are approximately uniformly distributed in the M time slots. When service 2 requires L2 time slots, L2 time slots are selected from the remaining time slots (namely M-L1 time slots) to be assigned to service 2, and positions of the L2 time slots are approximately uniformly distributed in the M-L1 time slots. When service 3 requires L3 time slots, L3 time slots are selected from the remaining time slots (namely M-L1-L2 time slots) to be assigned to service 3, and positions of the L3 time slots are approximately uniformly distributed in the M-L1-L2 time slots. The process goes on like this until all services have been assigned.

Figure 3:
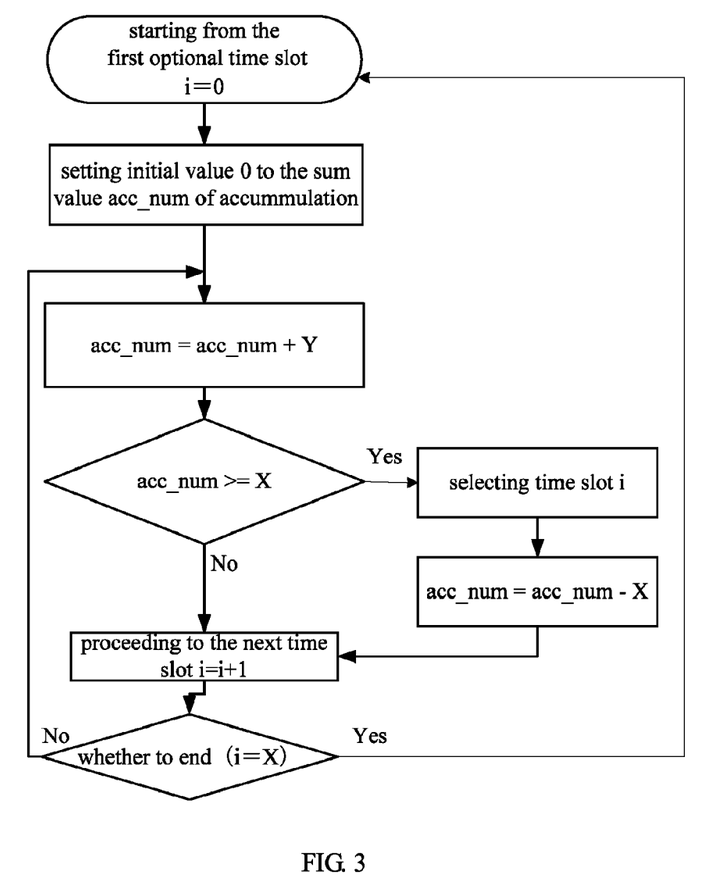
FIG. 3 is a flowchart showing the approximately uniform distribution algorithm according to the second embodiment of the present invention.

The approximately uniform distribution algorithm, namely the algorithm as how to select Y time slots (or positions) from X optional time slots (or positions), and the method to make the spacings of the Y time slots approximately uniform can make reference to FIG. 3, as follows.

Assume index of the optional time slots is indicated by i, acc_num indicates a sum value of accumulation, and initial values of i and acc_num are all set as 0. Starting from the first optional time slot, acc_num is added to Y to judge whether greater than or equal to X. If less than X, the next time slot is proceeded to, namely the time slot with the index of (i+1) is proceeded to, and it is judged whether to end. If yes, the selection flow is ended, and the process returns to select Y time slots from X optional time slots in the next multiplexed frame by the same method. If not, the process returns to perform the steps of adding acc_num by Y and then judging whether greater than or equal to X. If the addition of acc_num by Y is greater than or equal to X, the time slot with the index of i is selected out, X is then subtracted from acc_num as the current value of the next acc_num, the next time slot is proceeded to, and a step is performed to judge whether to end.

For instance, assume X is 11 and Y is 3, i.e., it is necessary to select three time slots for use from 11 optional time slots, then the selected time slots are as shown in Table 1, in which "YES" in the field of "Assignment" represents a selected time slot, while "NO" represents a time slot not selected.

TABLE 1

| Time Slot Number | acc_num Current Value | Addition or Subtraction Operation | Assignment |
| --- | --- | --- | --- |
| 0 | 0 | +3 | NO |
| 1 | 3 | +3 | NO |
| 2 | 6 | +3 | NO |
| 3 | 9 | +3-11 | YES |
| 4 | 1 | +3 | NO |
| 5 | 4 | +3 | NO |
| 6 | 7 | +3 | NO |
| 7 | 10 | +3-11 | YES |
| 8 | 2 | +3 | NO |
| 9 | 5 | +3 | NO |
| 10 | 8 | +3-11 | YES |

As can be known from Table 1, the selected time slots are numbered as 3, 7 and 10. However, since 11 cannot be exactly divided by 3, the selected 3 time slots are not entirely uniform, as they are only approximately uniform.

After the time slots are selected, it is possible to insert the byte streams of the various services into time slots (positions), identical in number with the number of the respective selected service assignment time slots, for transmission. The number of service assignment time slots means the number of time slots of the services selectable from the multiplexed frame, and its value depends on the frame period of the multiplexed frame as well as the bandwidth required by the services. Assume the number of service assignment time slots is L, the frame period of the multiplexed frame is T, and the bandwidth required by the services is B, then the number of service assignment time slots can be expressed as $$L = \left[\frac{B \times T}{8}\right] + 2,$$

namely, the bandwidth B required by the services is multiplied with the frame period T of the multiplexed frame to obtain the number of bits of each multiplexed frame, and this number is divided by 8 to obtain the number of time slots (each time slot has 8 bits) of each multiplexed frame. In case of inexact division, rounding up is performed, and 2 time slots are then added for asynchronous adjustment and adjustment control. "[ ]" in the above expression indicates the rounding up operation.

Figure 4:
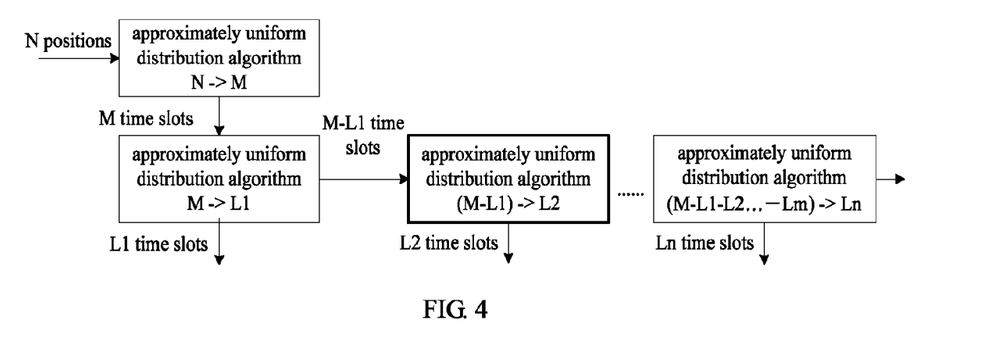
FIG. 4 is a schematic view illustrating the cascaded time slot assigning method according to the second embodiment of the present invention.

Assignment of time slots can be carried out by a hardware unit performing real-time pipeline calculation, assignment of time slots for a plurality of services is carried out through sequential cascading by approximately uniform distribution algorithm modules of similar structures, and the cascading sequence can be determined in accordance with levels of priority of the services, with the service of higher level being the previous service and the service of lower level being the next service, that is to say, cascade is performed in a descending order from higher levels to lower levels of priority, and each approximately uniform distribution algorithm module assigns time slots under control of different parameters (the number of optional time slots may be different from the number of service assignment time slots). For instance, referring to FIG. 4, assume the number of Clock periods of each multiplexed frame is N, the number of valid time slots of each multiplexed frame is M, the number of service assignment time slots of service 1 is L1, the number of service assignment time slots of service 2 is L2 . . . , and the number of service assignment time slots of service n is Ln. In addition, the number of service assignment time slots of service higher by one level than service n is Lm. Then, the approximately uniform distribution algorithm is firstly used to select M positions from N positions as valid time slots. The approximately uniform distribution algorithm is used again to select L1 time slots from the selected M positions to be assigned to service 1. L2 time slots are selected from M-L1 time slots to be assigned to service 2, and Ln time slots are selected from M-L1-L2-Lm time slots to be assigned to service n. The process runs like this until all services are assigned with time slots. As should be noted, since the TDM service is relatively sensitive to delay, it is therefore preferable to firstly assign time slots to the TDM service, and the remaining time slots are then used to transmit packet services that are not so sensitive to time.

The link bandwidth mode under each modulation mode corresponds to one set of frame structure parameters, which is also referred to as frame structure parameter set. The frame structure parameter set includes such parameters as the number of Clock periods N, the number of valid time slots M and the number of the service assignment time slots L1, L2, etc., of each multiplexed frame, and all frame structure parameter sets are stored in a storage (such as an RAM) accessible with link bandwidth mode number. The number of service assignment time slots such as L1, L2, etc., can be obtained in advance by the method of calculating the number of service assignment time slots as provided above, while no repetition will be made here.

Of course, before hybrid-multiplexing each frame of data, the hybrid-multiplexing apparatus can obtain the frame structure parameter set again, and then hybrid-multiplex the received byte streams in accordance with the frame structure parameter set. But this will generate too many signaling flows. Accordingly, it is preferable for the modulation device to notify the hybrid-multiplexing apparatus in advance when it is needed for the modulation mode to vary, indicating that the channel is about to switch to a new modulation mode, and that the link bandwidth of the physical link is about to vary, and to provide the link bandwidth mode number to which the new modulation mode corresponds. Upon reception of the notification, the hybrid-multiplexing apparatus extracts the corresponding frame structure parameter set from the RAM in accordance with the modulation mode number, applies the new parameters, namely such parameters as N, M, L1 and L2, etc., in the new frame structure parameter set, to each of the approximately uniform distribution algorithm modules at the predetermined frame boundary, assigns time slots for various services again, and inserts the byte streams of the received various services into the respective assigned time slots for transmission, that is to say, the frame structure of the original multiplexed frame is changed to perform hybrid-multiplexing anew. Moreover, since the frame structure varies at the frame boundary (the end of the previous frame and the start of the next frame), such variation of the frame structure causes no damage, namely engenders no bit errors or erroneous packets.

As can be known from the above, the hybrid multiplexing method provided by this embodiment adaptively varies the frame structure of the multiplexed frame without breaking off the service, i.e., it supports ACM switching. In this embodiment a frame structure parameter set is preset to correspond to the link bandwidth mode to which each modulation mode corresponds, and the frame structure parameter set includes such parameters as the number of Clock periods and the number of valid time slots of each multiplexed frame and the number of service assignment time slots of various services. When the bandwidth mode of the physical link varies due to channel switching of modulation modes, the modulation device notifies the hybrid-multiplexing apparatus in advance, and sends the link bandwidth mode number to which the new modulation mode corresponds to the hybrid-multiplexing apparatus, so that the hybrid-multiplexing apparatus extracts from the storage the corresponding frame structure parameter set in accordance with the link bandwidth mode number, assigns time slots for various services in accordance with the parameters of the frame structure parameter set, and respectively inserts the byte streams of the various services into the respective assigned time slots for transmission to form a new multiplexed frame different from the original frame structure. The service does not break off in the process, and since the frame structure of the new multiplexed frame is formed in accordance with the new link bandwidth mode, and since the frame structure is under control of the parameters (frame structure parameter set), it is not only possible to make full use of the bandwidth of the physical link and enhance utilization rate of the physical link, but also possible to adapt to any rates of the physical link.

Moreover, since the frame structure varies at the frame boundary, such variation of the frame structure causes no damage, namely engenders no bit errors or erroneous packets.

Furthermore, since what is employed is to insert the byte streams into the time slots for transmission, and the time slots assigned to the services are approximately uniformly distributed in the frame structure, the overhead in the frame structure is relatively low, and both the jittering and delay of service transmission are also very small. To the TDM service which is relatively sensitive to delay, it is of great importance for both the jittering and delay of service transmission to be small.

Third Embodiment

With respect to the hybrid-multiplexing method as recited in the first and second embodiments, the embodiment of the present invention correspondingly provides a demultiplexing method.

Figure 5:
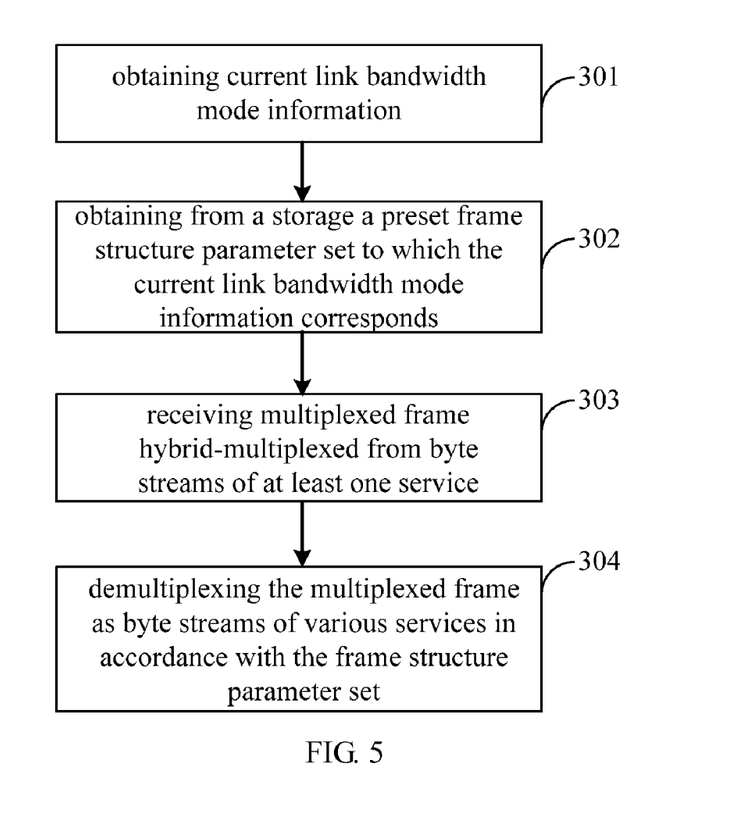
FIG. 5 is a flowchart showing the hybrid-multiplexing method according to the third embodiment of the present invention.

After the receiving side receives the multiplexed frame hybrid-multiplexed by the hybrid-multiplexing method provided by the embodiments of the present invention, the current link bandwidth mode information is obtained, a preset frame structure parameter set that corresponds to the bandwidth mode information is then obtained from a storage, and the multiplexed frame is subsequently demultiplexed in accordance with the frame structure parameter set to restore the services. As shown in FIG. 5, specific operational flow of the demultiplexing method is described as follows.

In step 301, the demultiplexing apparatus obtains the current link bandwidth mode information, which can either be the link bandwidth value or the link bandwidth mode number. The following embodiments make explanations by all taking as an example the link bandwidth mode information being the link bandwidth mode number.

Link bandwidth modes are provided for all different modulation modes, and each link bandwidth mode has a link bandwidth mode number that identifies itself, that is to say, once obtaining the current link bandwidth mode number, the demultiplexing apparatus knows which modulation mode and which link bandwidth mode are currently employed by the physical link.

In step 302, the demultiplexing apparatus obtains from a storage a preset frame structure parameter set to which the current link bandwidth mode information corresponds, for instance, by obtaining from the storage a preset frame structure parameter set to which the current link bandwidth mode number corresponds.

The frame structure parameter set is preset in accordance with such factors as the attributes of the physical link having ACM switching function and the attributes of the services transmitted over the physical link. The number of frame structure parameter sets corresponds or equals to the number of the link bandwidth modes. For instance, the physical link having ACM switching function has three link bandwidth modes, then respective one frame structure parameter set is calculated in accordance with each link bandwidth mode and the hybrid circumstance of the service under this link bandwidth mode. In other words, the physical link having ACM switching function has three frame structure parameter sets. Each link bandwidth mode number corresponds to one frame structure parameter set, and all frame structure parameter sets are subsequently stored in the storage, e.g., a storage of a programmable logic device.

In step 303, the demultiplexing apparatus receives a multiplexed frame hybrid-multiplexed from the byte streams of at least one service, e.g., a plurality of services.

The multiplexed frame is hybrid-multiplexed through hybrid-multiplexing the byte streams of the received various services by the hybrid-multiplexing apparatus at the transmitting side by means of the hybrid-multiplexing method provided by the embodiments of the present invention.

In step 304, the demultiplexing apparatus demultiplexes the multiplexed frame into byte streams of various services in accordance with the frame structure parameter set.

For instance, if the system employs the method of the second embodiment to perform hybrid-multiplexing, it is correspondingly necessary for the demultiplexing apparatus to perform demultiplexing also by employing this method, i.e., to assign time slots for the various services in accordance with the frame structure parameter set, and to respectively extract the corresponding byte streams of the services from the multiplexed frame in accordance with the time slots assigned to the various services.

Specifically, assume the number of Clock periods of each multiplexed frame is N, the number of valid time slots of each multiplexed frame is M, the number of service assignment time slots of the services is L, and the frame structure parameter set includes N, M and the number of service assignment time slots L of the various services, then, the demultiplexing apparatus updates the values of the parameters in the approximately uniform distribution algorithm modules in accordance with the frame structure parameter set, employs the approximately uniform distribution algorithm to select M positions, namely time slots, from N positions, and subsequently employs the approximately uniform distribution algorithm again to select L positions of the various services from the selected M positions. The method of assigning the time slots is identical with the method of assigning the time slots in the second embodiment. See the second embodiments for details, while no repetition will be made here. The demultiplexing apparatus then respectively extracts the corresponding byte streams of the services from the multiplexed frame in accordance with the positions, identical in number with the number of the service assignment time slots L, of the various services, and transmits the same to the downstream device, namely a service de-packaging module to restore the services. In short, the positions of the byte streams of the services are obtained first, and the byte streams of the services are then extracted from these positions to restore the services.

If the hybrid-multiplexing device of the transmitting side obtains the frame structure parameter set again before hybrid-multiplexing each frame of data, and then hybrid-multiplexes the received byte streams in accordance with the frame structure parameter set, correspondingly, the demultiplexing apparatus also needs to obtain again the frame structure parameter set before demultiplexing each frame of data, and then demultiplexes the received multiplexed frame in accordance with the frame structure parameter set. If the hybrid-multiplexing device of the transmitting side obtains the frame structure parameter set again only after receiving the notification sent from the modulation device about the switching of modulation modes, the demultiplexing apparatus correspondingly obtains the frame structure parameter set in accordance with the notification after reception thereof sent from the modulation device about the switching of modulation modes. Of course, employment of the latter solution is preferable, as it saves signaling flows.

As can be known from the above, this embodiment provides a demultiplexing method that corresponds to the hybrid-multiplexing method provided by other embodiments of the present invention. Since the hybrid-multiplexing method provided by the embodiments of the present invention can support ACM switching, and achieve such advantageous effects as making full use of the bandwidth of the physical link, enhancing the utilization rate of the physical link, flexibly adapting to various rates of the physical link, ensuring no break-off and no damage of the service during switching, and having small jittering and delay in service transmission, it is deducible that the demultiplexing method provided by this embodiment also supports ACM switching, and achieves the same advantageous effects.

Of course, as seen from the demultiplexing method itself as provided by this embodiment, since what is employed is to respectively extract the corresponding byte streams of the services from the multiplexed frames in accordance with the positions, identical in number with the number of the service assignment time slots, of various services, both the jittering and delay of the service are also very small, thus facilitating the system to perform follow-up processing on the byte streams of the various services, for instance, the de-packaging processing performed by the de-packaging module on the byte streams of the various services, and further ensuring system stability.

Fourth Embodiment

To better implement the aforementioned methods, embodiments of the present invention correspondingly provide a hybrid-multiplexing apparatus, which will be described in greater detail below.

Figure 6:
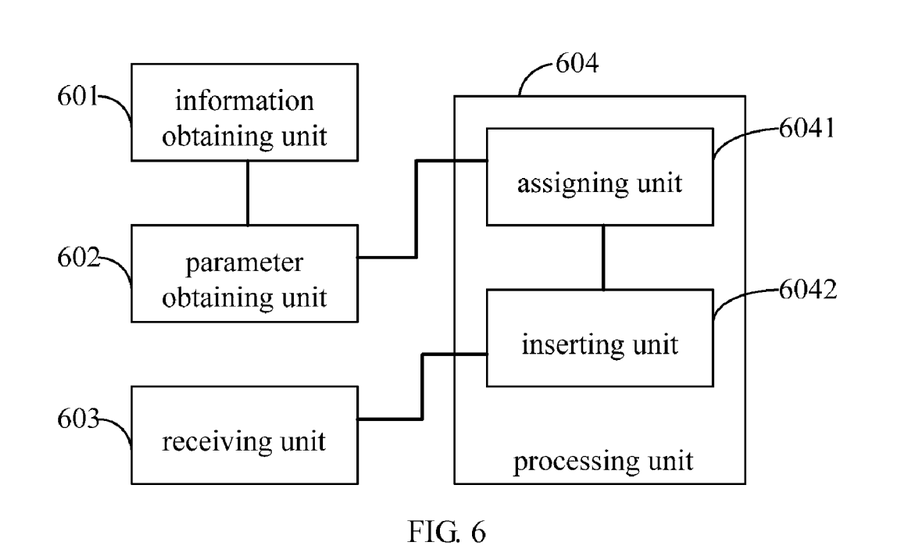
FIG. 6 is a schematic structural view showing the hybrid-multiplexing apparatus according to the fourth embodiment of the present invention.

A hybrid-multiplexing apparatus, as shown in FIG. 6, comprises an information obtaining unit 601, a parameter obtaining unit 602, a receiving unit 603 and a processing unit 604.

The information obtaining unit 601 obtains the current link bandwidth mode information, which can either be the bandwidth value or the link bandwidth mode number.

For instance, the system sets link bandwidth modes for all different modulation modes, and each link bandwidth mode has a link bandwidth mode number that identifies itself, that is to say, once obtaining the current link bandwidth mode number, the hybrid-multiplexing apparatus knows which modulation mode and which link bandwidth mode are currently employed by the physical link.

The parameter obtaining unit 602 obtains from a storage a preset frame structure parameter set that corresponds to the current link bandwidth mode information obtained by the information obtaining unit 601.

Of course, the precondition is to thus set in advance that the link bandwidth mode under each modulation mode corresponds to one frame structure parameter set. The frame structure parameter set includes such parameters as the number of Clock periods N and the number of valid time slots M of each multiplexed frame and the number of service assignment time slots L1, L2, etc., of various services. All frame structure parameter sets are stored in a storage (such as an RAM) accessible with the link bandwidth mode information, such as the link bandwidth mode number. The number of service assignment time slots L1, L2, etc., can be calculated in advance by the method of calculating the number of service assignment time slots provided by the second embodiment, while no repetition is made here.

The receiving unit 603 receives byte streams of at least one service, e.g., a plurality of services.

Before multiplexing, a device previous to the hybrid-multiplexing apparatus, a packaging module for example, packages and adapts each service as independent byte streams. For example, the packet service can employ the GFP packaging method, and TDM service can employ the adapting method of asynchronous mapping, and so on, wherein link maintenance overhead can also be regarded as a service. Subsequently, the packaging module transmits the packaged byte streams of a plurality of services to the receiving unit 603 of the hybrid-multiplexing apparatus.

The processing unit 604 hybrid-multiplexes the byte streams of the plurality of services received by the receiving unit 603 in accordance with the frame structure parameter set obtained by the parameter obtaining unit 602.

The processing unit 604 may include an assigning unit 6041 and an inserting unit 6042.

The assigning unit 6041 assigns time slots for various services in accordance with the frame structure parameter set obtained by the parameter obtaining unit 602.

The assigning unit 6041 can be formed through sequential cascading of a plurality of approximately uniform distribution algorithm modules having identical structures, and the cascading sequence can be determined in accordance with levels of priority of the services, with the service of higher level being the previous service and the service of lower level being the next service, that is to say, cascade is performed in a descending order from higher levels to lower levels of priority, and each approximately uniform distribution algorithm module assigns time slots under control of different parameters (the number of optional time slots may be different from the number of service assignment time slots). See the second embodiment for the detailed method of assigning time slots.

The inserting unit 6042 inserts the byte streams of the various services received by the receiving unit 603 into the time slots assigned by the assigning unit 6041 for transmission.

As can be known from the above, the hybrid-multiplexing apparatus provided by this embodiment can support ACM switching. In this embodiment, respective one frame structure parameter set is preset to correspond to the link bandwidth mode to which each modulation mode corresponds. Before hybrid-multiplexing, the information obtaining unit 601 of the hybrid-multiplexing apparatus obtains the current link bandwidth mode information, the parameter obtaining unit 602 subsequently extracts from a storage the corresponding frame structure parameter set in accordance with the link bandwidth mode information, and the processing unit 604 finally assigns time slots for various services in accordance with the frame structure parameter set, and inserts byte streams of the various services received by the receiving unit 603 into the respective assigned time slots for transmission, so that when the bandwidth of the physical link varies due to switching of modulation modes on the physical link, the hybrid-multiplexing apparatus learns of this in time to adaptively change (or switch) the frame structure of the multiplexed frame without breaking off the service. Since the frame structure of the multiplexed frame is under control of the frame structure parameter set, it is adapted to any rates of the physical link, that is to say, it varies with variation of the bandwidth of the physical link, so as to achieve the objectives of making full use of the bandwidth of the physical link and enhancing the utilization rate of the physical link. Moreover, since the frame structure varies at the frame boundary, such variation of the frame structure causes no damage, namely engenders no bit errors or erroneous packets.

Furthermore, since what is employed is for the inserting unit 6042 to insert the byte streams into the time slots for transmission, and the time slots assigned by the assigning unit 6041 to the various services are approximately uniformly distributed in the frame structure, the overhead in the frame structure is relatively low, and both the jittering and delay of service transmission are also very small.

Fifth Embodiment

Figure 7:
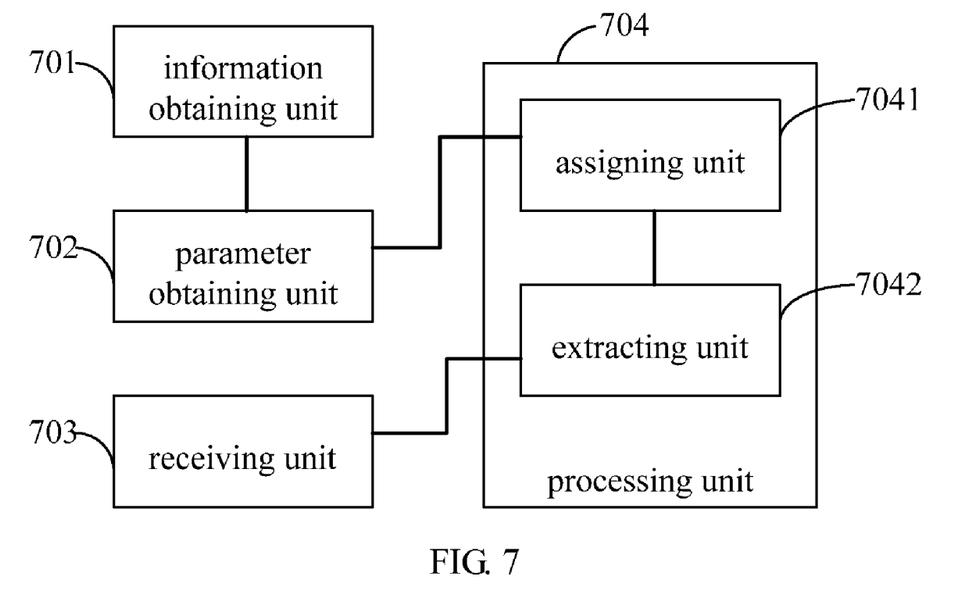
FIG. 7 is a schematic structural view showing the demultiplexing apparatus according to the fifth embodiment of the present invention.

The embodiment of the present invention further provides a demultiplexing apparatus that corresponds to the hybrid-multiplexing apparatus. As shown in FIG. 7, the demultiplexing apparatus comprises an information obtaining unit 701, a parameter obtaining unit 702, a receiving unit 703 and a processing unit 704.

The information obtaining unit 701 obtains the current link bandwidth mode information, which can either be the bandwidth value or the link bandwidth mode number.

For instance, link bandwidth modes are set for all different modulation modes, and each link bandwidth mode has a link bandwidth mode number that identifies itself, that is to say, once obtaining the current link bandwidth mode number, the demultiplexing apparatus knows which modulation mode and which link bandwidth mode are currently employed by the physical link.

The parameter obtaining unit 702 obtains from a storage a preset frame structure parameter set that corresponds to the current link bandwidth mode information obtained by the information obtaining unit 701.

Of course, the precondition is to thus set in advance that the link bandwidth mode under each modulation mode corresponds to one frame structure parameter set. The frame structure parameter set includes such parameters as the number of Clock periods N and the number of valid time slots M of each multiplexed frame and the number of service assignment time slots L1, L2, etc., of various services. All frame structure parameter sets are stored in a storage (such as an RAM) accessible with the link bandwidth mode information, such as the link bandwidth mode number. The number of service assignment time slots L1, L2, etc., can be calculated in advance by the method of calculating the number of service assignment time slots provided by the second embodiment, while no repetition is made here.

The receiving unit 703 receives the multiplexed frame hybrid-multiplexed from the byte streams of the received various services.

The multiplexed frame is formed by the hybrid-multiplexing apparatus of the transmitting side hybrid-multiplexing the byte streams of received various services by using the hybrid-multiplexing method provided in the embodiments of the present invention. The hybrid-multiplexing apparatus of the transmitting side hybrid-multiplexes the byte streams of the various services into the multiplexed frame, and then transmits it to the receiving unit 703 of the demultiplexing apparatus of the receiving side over the physical link.

The processing unit 704 demultiplexes the multiplexed frame received by the receiving unit 703 into byte streams of various services in accordance with the frame structure parameter set obtained by the parameter obtaining unit 702.

The processing unit 704 can include an assigning unit 7041 and an extracting unit 7042.

The assigning unit 7041 assigns time slots for various services in accordance with the frame structure parameter set obtained by the parameter obtaining unit 702.

The assigning unit 7041 can be formed through sequential cascading of approximately uniform distribution algorithm modules having identical structures, and the cascading sequence can be determined in accordance with levels of priority of the services, with the service of higher level being the previous service and the service of lower level being the next service, that is to say, cascade is performed in a descending order from higher levels to lower levels of priority, and each approximately uniform distribution algorithm module assigns time slots under control of different parameters (the number of optional time slots may be different from the number of service assignment time slots). See the second embodiment for the detailed method of assigning time slots.

The extracting unit 7042 extracts the corresponding byte streams of the services from the multiplexed frame received by the receiving unit 703 in accordance with the time slots assigned by the assigning unit 7041 to the various services.

As should be noted, it is necessary for the demultiplexing apparatus to demultiplex by using the method corresponding to that of the hybrid-multiplexing apparatus. That is to say, the demultiplexing apparatus should firstly know the specific positions of the byte streams of the various services in the multiplexed frame or in which time slots before respectively extracting the byte streams of the various services to restore the services.

As can be known from the above, this embodiment provides a demultiplexing apparatus that corresponds to the hybrid-multiplexing apparatus provided by another embodiment of the present invention. Since the hybrid-multiplexing apparatus provided by the embodiment of the present invention can support ACM switching, and achieve such advantageous effects as making full use of the bandwidth of the physical link, enhancing the utilization rate of the physical link, flexibly adapting to various rates of the physical link, ensuring no break-off and no damage of the service during switching, and having small jittering and delay in service transmission, it is deducible that the demultiplexing apparatus provided by this embodiment also supports ACM switching, and achieves the same advantageous effects.

Of course, as seen from the demultiplexing apparatus itself as provided by this embodiment, since the processing unit 704 of the demultiplexing apparatus extracts the corresponding byte streams of the services from the multiplexed frames in accordance with the positions, identical in number with the number of the service assignment time slots, of the various services, both the jittering and delay of the service are also very small, thus facilitating the system to perform follow-up processing on the byte streams of the various services, for instance, the de-packaging processing performed by the de-packaging module on the byte streams of the various services, and further ensuring system stability.

Sixth Embodiment

Figure 8:
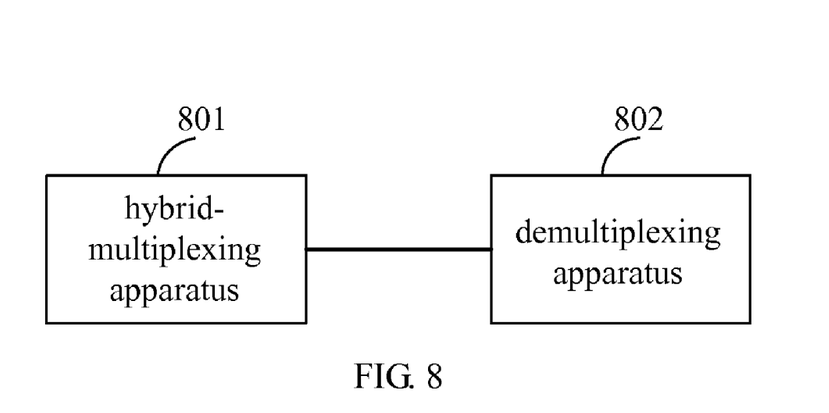
FIG. 8 is a schematic structural view showing the communications system according to the sixth embodiment of the present invention.

The embodiment of the present invention further provides a communications system that comprises the apparatuses provided by the embodiments of the present invention, namely the hybrid-multiplexing apparatus 801 and the demultiplexing apparatus 802.

The hybrid-multiplexing apparatus 801 obtains current link bandwidth mode information, obtains from a storage a preset frame structure parameter set that corresponds to the current link bandwidth mode information, hybrid-multiplexes received byte streams of at least one service in accordance with the frame structure parameter set to form a multiplexed frame, and transmits the multiplexed frame to the demultiplexing apparatus 802, wherein the link bandwidth mode information can either be the bandwidth value or the link bandwidth mode number.

The demultiplexing apparatus 802 receives the multiplexed frame hybrid-transmitted from the hybrid-multiplexing apparatus 801, and demultiplexes the multiplexed frame into byte streams of various services.

The hybrid-multiplexing apparatus 801 may include an information obtaining unit 601, a parameter obtaining unit 602, a receiving unit 603 and a processing unit 604, of which the processing unit 604 can further include an assigning unit 6041 and an inserting unit 6042.

The demultiplexing apparatus 802 may include an information obtaining unit 701, a parameter obtaining unit 702, a receiving unit 703 and a processing unit 704, of which the processing unit 704 can include an assigning unit 7041 and an extracting unit 7042.

These will be described in further detail below by way of examples.

When the modulation mode of the physical link is about to vary, the modulation device notifies in advance about the immediate switching of the channel to a new modulation mode, sends the notification to the hybrid-multiplexing apparatus 801 at the transmitting side, and carries therewith the link bandwidth mode information to which the new modulation mode corresponds. After the information obtaining unit 601 of the hybrid-multiplexing apparatus 801 at the transmitting side receives the link bandwidth mode information, the parameter obtaining unit 602 of the hybrid-multiplexing apparatus 801 at the transmitting side extracts the corresponding frame structure parameter set from the RAM according to the modulation mode information, the assigning unit 6041 of the hybrid-multiplexing apparatus 801 at the transmitting side employs the approximately uniform distribution algorithm to assign time slots for the various services in accordance with the frame structure parameter set, and the inserting unit 6042 insets the byte streams of the various services received by the receiving unit 603 into the time slots assigned by the assigning unit 6041 for transmission, namely to form the multiplexed frame. Since the frame structure of the multiplexed frame is under control of the frame structure parameter set, it can adapt to any rates of the physical link, and vary with variation of the bandwidth of the physical link.

Similarly, the information obtaining unit 701 of the demultiplexing apparatus 802 at the receiving side also receives the link bandwidth mode information which is transmitted from the modulation device and to which the new modulation mode corresponds, the parameter obtaining unit 702 of the demultiplexing apparatus 802 at the receiving side extracts the corresponding frame structure parameter set from the RAM in accordance with the modulation mode information, the assigning unit 7041 of the demultiplexing apparatus 802 at the receiving side employs the approximately uniform distribution algorithm to assign time slots for various services in accordance with the frame structure parameter set, and the extracting unit 7042 extracts the corresponding byte streams of the services from the multiplexed frame received by the receiving unit 703 in accordance with the time slots assigned to the various services by the assigning unit 7041, so as to restore the services.

As should be noted, to ensure that no damage is done to the service, switching of the frame structure occurs at the frame boundary.

As can be known from the above, the communications system provided in this embodiment can support ACM switching. The hybrid-multiplexing apparatus at the transmitting side of the communications system provided in this embodiment obtains the current link bandwidth mode information, obtains from a storage the frame structure parameter set to which the link bandwidth mode information corresponds, and hybrid-multiplexes the byte streams of the received various services in accordance with the frame structure parameter set, so that when the bandwidth of the physical link varies due to switching of modulation modes on the physical link, the hybrid-multiplexing apparatus learns of this in time to adaptively change the frame structure of the multiplexed frame without breaking off the service, thereby achieving the objectives of enhancing the utilization rate of the physical link and ensuring that the service does not break off. Thereafter, the demultiplexing apparatus at the receiving side employs the same method to extract the byte streams of the various services from the multiplexed frame, so as to restore the services. Furthermore, since what is employed is to insert the byte streams into the time slots for transmission, and the time slots assigned to the services are approximately uniformly distributed in the frame structure, the overhead in the frame structure is relatively low, and both the jittering and delay of service transmission are also very small.

In summary, the embodiments of the present invention have the advantageous effects as described below.

The hybrid-multiplexing method, hybrid-multiplexing apparatus, demultiplexing apparatus and communications system provided by the embodiments of the present invention can all support ACM switching. In the embodiments, a corresponding frame structure parameter set is preset for the link bandwidth mode to which each modulation mode corresponds, and the frame structure parameter set includes such parameters as the number of Clock periods and the number of valid time slots of each multiplexed frame as well as the number of service assignment time slots of the various services, etc. When the bandwidth mode of the physical link varies due to channel switching of modulation modes, the modulation device notifies the hybrid-multiplexing apparatus at the transmitting side in advance, and sends the link bandwidth mode information to which the new modulation mode corresponds to the hybrid-multiplexing apparatus at the transmitting side. Thus, the hybrid-multiplexing apparatus at the transmitting side can extract from the storage the corresponding frame structure parameter set in accordance with the link bandwidth mode information, assign time slots for various services in accordance with the parameters of the frame structure parameter set, and insert the byte streams of the received various services into the respective assigned time slots for transmission, so as to form a new multiplexed frame different from the original frame structure. The process is continuous and the service is not broken off. Since the frame structure of the new multiplexed frame is formed in accordance with the new link bandwidth mode, and since the frame structure is under control of the parameters (frame structure parameter set), it is not only possible to make full use of the bandwidth of the physical link and enhance the utilization rate of the physical link, but also possible to adapt to any rates of the physical link. Correspondingly, the demultiplexing apparatus at the receiving side also receives the notification sent from the modulation device notifying that the modulation mode of the channel is about to switch and the link bandwidth mode information to which the new modulation mode corresponds. The demultiplexing apparatus at the receiving side employs the same method to learn of the specific positions of the byte streams of the various services in the multiplexed frame received thereby, and respectively extracts the byte streams of the various services from these positions, so as to restore the services.

Since the frame structure varies at the frame boundary, such variation of the frame structure causes no damage, namely engenders no bit errors or erroneous packets. Furthermore, since what is employed is to insert the byte streams into the time slots for transmission, and the time slots assigned to the services are approximately uniformly distributed in the frame structure, the overhead in the frame structure is relatively low, and both the jittering and delay of service transmission are also very small. To the TDM service which is relatively sensitive to delay, it is of great importance for both the jittering and delay of service transmission to be small, so that the present invention is especially suitable for hybrid transmission of the TDM service and packet service.

As comprehensible to persons ordinarily skilled in the art, the entire or partial steps in the various methods of the aforementioned embodiments can be carried out by a program instructing the relevant hardware. The program can be stored in a computer-readable storage medium, including ROM, RAM, magnetic disk or optical disc, etc.

The methods, apparatuses and system for hybrid-multiplexing and demultiplexing as provided by the embodiments of the present invention are described in detail above, and concrete examples are used here to enunciate the principles and implementation of the present invention. Explanations of the embodiments merely aim to help understand the methods and essential concepts of the present invention. Meanwhile, persons ordinarily skilled in the art would make modifications in terms of specific embodiments and application scopes without departing from the concepts of the present invention. In summary, contents of the present Description shall not be understood as restrictive to the present invention.

What is claimed is:

1. A method for hybrid-multiplexing, comprising:
   obtaining current link bandwidth mode information;
   obtaining from a storage a preset frame structure parameter set that corresponds to the current link bandwidth mode information, the preset frame structure parameter set including: a number of Clock periods N, a number of valid time slots M of each multiplexed frame, and a number of service assignment time slots L of the various services, wherein a clock frequency of the multiplexed frame remains invariant under various frame structures;
   receiving byte streams of at least one service;
   hybrid-multiplexing the byte streams of the at least one service in accordance with the frame structure parameter set;
   wherein hybrid-multiplexing the byte streams of the service in accordance with the frame structure parameter set comprises:
      assigning a time slot for the at least one service in accordance with the frame structure parameter set, and
      transmitting the byte streams of the at least one service by inserting the byte streams of the at least one service into the assigned time slot;
   wherein assigning a time slot for the at least one service in accordance with the frame structure parameter set comprises: selecting M positions from N positions by using an approximately uniform distribution algorithm, and selecting L positions of the various services from the selected M positions by using the approximately uniform distribution algorithm; and
   wherein inserting byte streams of the at least one service into the assigned time slot comprises: respectively inserting byte streams of the at least one service into a respective one of the selected L positions for transmission.

2. The method for hybrid-multiplexing according to claim 1, wherein obtaining current link bandwidth mode information comprises:
   receiving a notification concerning switching of a modulation mode transmitted from a modulation device; and
   obtaining the current link bandwidth mode information in accordance with the notification.

3. A method for demultiplexing, comprising:
   obtaining current link bandwidth mode information;
   obtaining from a storage a preset frame structure parameter set that corresponds to the current link bandwidth mode information, the preset frame structure parameter set including a number of Clock periods N, a number of valid time slots M of each multiplexed frame, and a number of service assignment time slots L of the various services, wherein a clock frequency of the multiplexed frame remains invariant under various frame structures;
   receiving a multiplexed frame hybrid-multiplexed from byte streams of at least one service;
   demultiplexing the multiplexed frame to obtain the byte streams of the at least one service in accordance with the frame structure parameter set;
   wherein demultiplexing the multiplexed frame comprises:
      assigning a time slot for the at least one service in accordance with the frame structure parameter set, and
      extracting byte streams of the at least one service from the multiplexed frame in accordance with the time slot assigned to the at least one service;
   wherein assigning a time slot for the at least one service in accordance with the frame structure parameter set comprises: selecting M positions from N positions by using an approximately uniform distribution algorithm, and selecting L positions of the various services from the selected M positions by using the approximately uniform distribution algorithm; and
   wherein extracting byte streams of the at least one service from the multiplexed frame in accordance with the time slot assigned to the at least one service comprises:
      extracting the byte streams of the at least one service from the multiplexed frame in accordance with the corresponding one of the L positions.

4. The method for demultiplexing according to claim 3, wherein obtaining current link bandwidth mode information comprises:
   receiving a notification concerning switching of a modulation mode transmitted from a modulation device; and
   obtaining the current link bandwidth mode information in accordance with the notification.

5. A hybrid-multiplexing apparatus, comprising:
   an information obtaining unit, for obtaining current link bandwidth mode information;
   a parameter obtaining unit, for obtaining from a storage a preset frame structure parameter set that corresponds to the current link bandwidth mode information obtained by the information obtaining unit, the preset frame structure parameter set including a number of Clock periods N, a number of valid time slots M of each multiplexed frame, and a number of service assignment time slots L of the various services, wherein a clock frequency of the multiplexed frame remains invariant under various frame structures;
   a receiving unit, for receiving byte streams of at least one service;
   a processing unit, for hybrid-multiplexing the byte streams of the at least one service received by the receiving unit in accordance with the frame structure parameter set obtained by the parameter obtaining unit; and
   wherein the processing unit comprises:
      an assigning unit, for assigning a time slot for the at least one service in accordance with the frame structure parameter set obtained by the parameter obtaining unit, specific for selecting M positions from N positions by using an approximately uniform distribution algorithm, and selecting L positions of the various services from the selected M positions by using the approximately uniform distribution algorithm; and an inserting unit, for inserting byte streams of the at least one service into the corresponding time slot assigned by the assigning unit, specifically for respectively inserting the byte streams of a plurality of services into a respective selected L positions for transmission.

6. A demultiplexing apparatus, comprising:
an information obtaining unit, for obtaining current link bandwidth mode information;
a parameter obtaining unit, for obtaining from a storage a preset frame structure parameter set that corresponds to the current link bandwidth mode information obtained by the information obtaining unit, the preset frame structure parameter set including a number of Clock periods N, a number of valid time slots M of each multiplexed frame, and a number of service assignment time slots L of the various services, wherein a clock frequency of the multiplexed frame remains invariant under various frame structures;
a receiving unit, for receiving a multiplexed frame hybrid-multiplexed from byte streams of at least one service;
a processing unit, for demultiplexing the multiplexed frame received by the receiving unit to obtain the byte streams of the at least one service in accordance with the frame structure parameter set obtained by the parameter obtaining unit; and
wherein the processing unit comprises:
an assigning unit, for assigning a time slot for the at least one service in accordance with the frame structure parameter set obtained by the parameter obtaining unit, specific for selecting M positions from N positions by using an approximately uniform distribution algorithm, and selecting L positions of the various services from the selected M positions by using the approximately uniform distribution algorithm; and
an extracting unit, for extracting the byte streams of the at least one service from the multiplexed frame received by the receiving unit in accordance with the corresponding time slot assigned to the at least one service by the assigning unit, specifically for respectively extracting byte streams of the corresponding services from the multiplexed frame in accordance with the L positions of the various services.

7. A communications system, comprising a hybrid-multiplexing apparatus and a demultiplexing apparatus,
the hybrid-multiplexing apparatus, configured to:
obtain current link bandwidth mode information;
obtain from a storage a preset frame structure parameter set that corresponds to the current link bandwidth mode information, the preset frame structure parameter set include: a number of Clock periods N, a number of valid time slots M of each multiplexed frame, and a number of service assignment time slots L of the various services, wherein a clock frequency of the multiplexed frame remains invariant under various frame structures;
receive byte streams of at least one service;
hybrid-multiplex the byte streams of the at least one service in accordance with the frame structure parameter set to form a multiplexed frame;
transmit the multiplexed frame to the demultiplexing apparatus;
wherein hybrid-multiplex the byte streams of the service in accordance with the frame structure parameter set comprises:
assign a time slot for the at least one service in accordance with the frame structure parameter set, and
transmit the byte streams of the at least one service by inserting the byte streams of the at least one service into the assigned time slot;
wherein assign a time slot for the at least one service in accordance with the frame structure parameter set comprises: select M positions from N positions by using an approximately uniform distribution algorithm, and select L positions of the various services from the selected M positions by using the approximately uniform distribution algorithm; and
wherein insert byte streams of the at least one service into the assigned time slot comprises: respectively insert byte streams of the at least one service into a respective one of the selected L positions for transmission; and
the demultiplexing apparatus, configured to receive the multiplexed frame hybrid-transmitted from the hybrid-multiplexing apparatus, and demultiplex the multiplexed frame into byte streams of various services.

* * * * *